US008679629B2

(12) United States Patent
Zhao et al.

(10) Patent No.: US 8,679,629 B2
(45) Date of Patent: *Mar. 25, 2014

(54) MICROCAPSULES, THEIR USE AND PROCESSES FOR THEIR MANUFACTURE

(75) Inventors: Chun-tian Zhao, Pudsey (GB); Kishor Mistry, Bradford (GB); Bryan David Grey, Bradford (GB)

(73) Assignee: BASF SE, Ludwigshafen (DE)

( * ) Notice: Subject to any disclaimer, the term of this patent is extended or adjusted under 35 U.S.C. 154(b) by 961 days.

This patent is subject to a terminal disclaimer.

(21) Appl. No.: 12/513,678

(22) PCT Filed: Nov. 14, 2007

(86) PCT No.: PCT/EP2007/062339
§ 371 (c)(1),
(2), (4) Date: May 6, 2009

(87) PCT Pub. No.: WO2008/064999
PCT Pub. Date: Jun. 5, 2008

(65) Prior Publication Data
US 2010/0036020 A1 Feb. 11, 2010

(30) Foreign Application Priority Data
Nov. 28, 2006 (GB) .................... 0623748.1

(51) Int. Cl.
*B01J 13/02* (2006.01)
*B32B 27/14* (2006.01)

(52) U.S. Cl.
USPC ....... 428/402.24; 428/320; 523/201; 523/223

(58) Field of Classification Search
USPC .............. 428/372, 402, 21, 402.22, 326, 407, 428/526; 430/137, 110, 138, 108, 106.6, 430/111, 122; 427/146, 201, 212, 389.9; 523/201, 409
See application file for complete search history.

(56) References Cited

U.S. PATENT DOCUMENTS

| 3,596,713 A | 8/1971 | Katz |
| 3,912,792 A | 10/1975 | Touval |
| 4,105,823 A | 8/1978 | Hasler et al. |
| 4,328,119 A * | 5/1982 | Iwasaki et al. ................. 264/4.7 |
| 5,456,852 A | 10/1995 | Isiguro |
| 5,498,345 A | 3/1996 | Jollenbeck et al. |
| 5,508,025 A | 4/1996 | Hoshino et al. |
| 5,723,059 A | 3/1998 | Snyder |
| 5,728,760 A | 3/1998 | Rose et al. |
| 6,200,681 B1 | 3/2001 | Jahns et al. |
| 6,359,031 B1 | 3/2002 | Lykke et al. |
| 6,716,526 B2 | 4/2004 | Weston et al. |
| 6,753,083 B2 | 6/2004 | Mistry et al. |
| 2002/0058732 A1* | 5/2002 | Mistry et al. ................. 523/201 |
| 2002/0146400 A1* | 10/2002 | Cincotta ..................... 424/94.1 |
| 2003/0118822 A1 | 6/2003 | Jahns et al. |
| 2004/0001923 A1 | 1/2004 | Kao |
| 2004/0182711 A1 | 9/2004 | Liang et al. |
| 2007/0224899 A1 | 9/2007 | Dungworth et al. |
| 2007/0248824 A1* | 10/2007 | Lang-Wittkowski et al. ....................... 428/402.24 |
| 2009/0155195 A1 | 6/2009 | Grey et al. |

FOREIGN PATENT DOCUMENTS

| GB | 1 507 739 A | 4/1978 |
| GB | 2 073 132 A | 10/1981 |
| WO | 99/24525 A1 | 5/1999 |
| WO | 01/54809 A1 | 8/2001 |
| WO | 02/36258 A2 | 5/2002 |
| WO | 2004/068234 A1 | 8/2004 |
| WO | 2005/105291 A1 | 11/2005 |
| WO | 2007/063001 A1 | 6/2007 |

OTHER PUBLICATIONS

Encyclopedia of Chemical Technology, vol. 19, 4th Edition, p. 891.
Great Britain Search Report Dated Mar. 28, 2007.

* cited by examiner

*Primary Examiner* — James J Seidleck
*Assistant Examiner* — S. Camilla Pourbohloul
(74) *Attorney, Agent, or Firm* — Shruti Costales

(57) ABSTRACT

A microcapsule comprising a core containing a hydrophobic liquid or wax within a polymeric shell, in which solid particles insoluble in the hydrophobic liquid or wax are distributed throughout the core, wherein an oil soluble dispersant polymer is adhered to the surface of the solid insoluble particles. Processes of obtaining the microcapsules and dispersions of microcapsules in a liquid are claimed. The microcapsules can be used in a variety of applications particularly in the field of thermal energy storage. Suitably the microcapsules can be designed to have a particular density and can be used in the transfer fluids where the density of the microcapsules are the same as the carrier fluid.

13 Claims, No Drawings

MICROCAPSULES, THEIR USE AND PROCESSES FOR THEIR MANUFACTURE

The invention relates to microcapsules that have a core surrounded by a polymeric shell in which the core contains a hydrophobic liquid or a hydrophobic wax. The shell is formed from hydrophobic mono functional ethylenically unsaturated monomer, polyfunctional ethylenically unsaturated monomer and optionally other monomer. In the invention the core may comprise an active ingredient such as ultra violet (UV) absorbers, flame retardants or phase change substances. Desirably the microcapsules can easily be incorporated into a variety of products such as recirculating fluid cooling systems.

There are many instances where it would be desirable to provide capsules comprising a shell surrounding a core material. For instance the core may comprise an active ingredient which is released slowly, such as fragrances, pesticides, medicaments and the like. In other instances it may be desirable for the core material encapsulated within the shell to remain substantially intact either permanently or at least until a suitable trigger induces the core to be released. There are instances where it is important that the core material is not released from the capsules. This includes for example encapsulated ultra violet light absorbers for use in sunscreens and articles of clothing.

Another important application includes encapsulated phase change materials which can be used as thermal energy storage products. Such products include fabrics and especially clothing.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid.

Variations of this type of process are described in GB-A-2073132, AU-A-27028/88 and GB-A-1507739, in which the capsules are preferably used to provide encapsulated inks for use in pressure sensitive carbonless copy paper.

WO-A-9924525 describes microcapsules containing as a core a lipophilic latent heat storage material with a phase transition at −20 to 120° C. The capsules are formed by polymerizing 30 to 100 wt. % C1-24 alkyl ester of (meth) acrylic acid, up to 80 weight % of a di- or multifunctional monomer and up to 40 weight % of other monomers. The microcapsules are said to be used in mineral molded articles.

WO-A-01/54809 provides capsules which can easily be incorporated into fibres without suffering the loss of an active core material during the spinning process. The capsules contain a polymeric shell which is formed from a monomer blend comprising A) 30 to 90% by weight methacrylic acid, B) 10 to 70% by weight alkyl ester of (meth)acrylic acid which is capable of forming a homopolymer of glass transition temperature in excess of 60° C. and C) 0 to 40% by weight other ethylenically unsaturated monomer.

US2003118822 describes microcapsules comprising one or more lipophilic substances as core material and a polymeric capsule shell. The lipophilic substances include solid inorganic particles having a mean diameter of between 45 and 1000 nm. The microcapsules are obtained by oil in water emulsion polymerisation of monomers comprising 30 to 100% by weight of C1-C24 alkyl esters of acrylic acid or methacrylic acid with up to 80% by weight of bifunctional or polyfunctional monomer and that is sparingly soluble in water and up to 40% of other monomers. The inorganic particles are said to migrate to the interface between the water phase and oil phase act as a protective colloid in the stabilisation during the reaction.

U.S. Pat. No. 6,200,681 also describes preparing microcapsules using finely divided solid particles such as metal salts or oxides as a protective colloid in the manufacture of said microcapsules.

WO 2005 105291 describes a composition comprising particles which comprise a core material within a polymeric shell, in which the core material comprises a hydrophobic substance. A special combination of features in which the polymeric shell must form at least 8% of the total weight of particles and polymeric shell is formed from a monomer blend that includes 5 to 90% by weight of an ethylenically unsaturated water soluble monomer, 5 to 90% by weight of a multifunctional monomer, and 0 to 55% by weight other monomer and in which the proportions of these monomers are chosen such that the particles exhibit a half height of at least 350° C. It is also suggested that the microcapsules can contain a variety of active materials. An extensive list of possible actives is given including UV absorbers, flame retardants, pigments, dyes, enzymes and detergent builders. Of the pigments identified a variety of organic and inorganic materials are included such as iron oxide pigments.

A further important area of application for phase change materials is in active temperature regulation systems employing recirculating fluids. It is well known that the efficiency of a heat transfer fluid can be increased by the introduction of micro encapsulated phase change materials. U.S. Pat. No. 3,596,713 describes using phase change materials in a heat transfer fluid containing particles made from a phase change material and an impervious housing. The particles expand on absorption of heat resulting in an increase in buoyancy resulting in a natural convection current. However, the phase change material within the particles has a lower density than conventional aqueous transfer fluids. Such a system would therefore be of limited application for aqueous carrier fluids or other fluids of higher density.

U.S. Pat. No. 5,723,059 describes heat transfer fluids containing particles in which halocarbons are included in the carrier fluid. The particles are designed to remain dispersed within the dispersing fluid by altering the composition of the carrier fluid to match the density of the particles. However, a change in the composition, for instance due to the preferential evaporation of one of components, would lead to a change in density and hence a change in the buoyancy of the particles.

US 2004 001923 describes heat transfer fluids in which particles containing phase change material are dispersed within a carrier fluid. The dispersion is rendered stable by adjusting the density of the particles to equate to the density of the carrier fluid. This is said to be achieved by including metal particles or other high-density materials within the particles. However, no indication is given as how the particles can be made. Conventional methods of preparing such particles may give an uneven distribution of metal particles or other high-density materials and consequently prevent the desired density to be achieved consistently.

An object of the present invention is to provide microcapsules of a desired density. In particular it is desirable to achieve this consistently.

Thus according to the present invention we provide a microcapsule comprising a core containing a hydrophobic liquid or wax within a polymeric shell, in which solid particles insoluble in the hydrophobic liquid or wax are distributed throughout the core, wherein an oil soluble dispersant polymer is adhered to the surface of the insoluble solid particles.

Microcapsules of the present invention may be formed from a number of different types of materials including aminoplast materials, particularly using melamine aldehyde condensates and optionally urea e.g. melamine-formaldehyde, urea-formaldehyde and urea-melamine-formaldehyde, gelatin, epoxy materials, phenolic, polyurethane, polyester, acrylic, vinyl or allylic polymers etc. Microcapsules with acrylic copolymer shell material formed from acrylic monomers have been found to be particular suitable. Other methods of making the microcapsules included interfacial polymerisation, other techniques resulting in polyurethane capsules. It is considered that any other general techniques for producing microcapsules may also be suitable for the present invention. These will need to be adapted by reference to the processes described in detail herein.

Included in the present invention is a process of manufacturing microcapsules comprising a core containing a hydrophobic liquid or wax within a polymeric shell, in which solid particles insoluble in the hydrophobic liquid or wax are distributed throughout the core, wherein an oil soluble dispersant polymer is adhered to the surface of the insoluble solid particles, comprising the steps, 1) providing a monomer blend comprising,
  i) hydrophobic mono functional ethylenically unsaturated monomer,
  ii) polyfunctional ethylenically unsaturated monomer, and
  iii) optionally other mono functional monomer(s),
2) combining the monomer mixture, insoluble solid particles and oil soluble dispersant polymer with the hydrophobic liquid or molten hydrophobic wax to form a monomer solution,
3) providing an aqueous phase, optionally containing polymeric stabiliser or emulsifying agent,
4) homogenising the monomer solution into the aqueous phase containing to form an emulsion,
5) subjecting the emulsion to polymerisation conditions, and
6) polymerising the monomer blend to form a dispersion of microcapsules in the aqueous phase.

Preferably the shell will form between 8 and 20% by weight of microcapsule and especially between 10 and 15%.

The microcapsules shell may be structured, for instance branched or cross-linked. In view of the presence of at least one polyfunctional ethylenically unsaturated monomer in the stated amounts the microcapsule shell will preferably tend to be cross-linked. Generally such cross-linking will render a polymeric shell insoluble although the polymeric shell may be capable of absorbing certain solvent liquids provided that the polymeric shell does not dissolve.

Preferably the monomer blend which will form the polymeric shell is formed from 1 to 95% by weight hydrophobic mono functional ethylenically unsaturated monomer,
5 to 99% by weight polyfunctional ethylenically unsaturated monomer and
0 to 60% by weight other mono functional monomer, based on the weight of the polymeric shell in which the components should total 100%.

More preferably the amount of hydrophobic mono functional ethylenically unsaturated monomer is between 5 and 30% by weight and the amount of polyfunctional ethylenically unsaturated monomer is between 70 and 95% by weight, based on the weight of the monomer blend. The amount of other monomer may be as much as 55% by weight and more preferably between 5 and 55% by weight. A particularly preferred monomer blend comprises between 5 and 25% by weight of hydrophobic mono functional ethylenically unsaturated monomer, between 35 and 45% by weight of polyfunctional ethylenically unsaturated monomer and between 40 and 50% by weight of other mono functional monomer.

In some instances it may be desirable to include more than one monomer from each component. For instance it may be desirable to include two or more hydrophobic mono functional ethylenically unsaturated monomers and/or two or more polyfunctional ethylenically unsaturated monomers and/or two or more other mono functional monomers.

The hydrophobic mono functional ethylenically unsaturated monomer may be any suitable monomer that carries one ethylenically group and as a solubility in water are below 5 g per 100 ml of water at 25° C., but usually less than 2 or 1 g/100 cc. The solubility in water may be zero or at least below detectable levels. Desirably the hydrophobic monomer will include one or more of styrene or derivatives of styrene, esters of mono ethylenically unsaturated carboxylic acids. Preferably the hydrophobic monomer will include alkyl esters of methacrylic acid or acrylic acid. More preferably the hydrophobic monomer is a C1-12 alkyl ester of acrylic or methacrylic acid. Such hydrophobic monomers may include for instance acrylic or methacrylic esters that are capable of forming a homopolymer that has a glass transition temperature (Tg) of at least 60° C. and preferably at least 80° C. Specific examples of these monomers include styrene, methyl methacrylate, tertiary butyl methacrylate, phenyl methacrylate, cyclohexyl methacrylate and isobornyl methacrylate.

Glass transition temperature (Tg) for a polymer is defined in the Encyclopaedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC).

The polyfunctional ethylenically unsaturated monomer can be any monomer and that induces cross-linking during the polymerisation. Preferably it is a diethylenically unsaturated or polyethylenically unsaturated monomer i.e. carrying two or more ethylenically unsaturated groups. Alternatively the polyfunctional ethylenically unsaturated monomer may contain at least one ethylenically unsaturated group and at least one reactive group capable of reacting with other functional groups in any of the monomer components. Preferably, the multifunctional monomer is insoluble in water or at least has a low water-solubility, for instance below 5 g/100 cc at 25° C., but usually less than 2 or 1 g/100 cc. The solubility in water can be zero or at least below detectable levels at 25° C. In addition the multifunctional monomer should be soluble or at least miscible with the hydrocarbon substance of the core material. Suitable multifunctional monomers include divinyl benzene, ethoxylated bisphenol A diacrylate, propoxylated neopentyl glycol diacrylate, tris(2-hydroxyethyl) isocyanurate triacrylate, trimethylolpropane triacrylate and an alkane diol diacrylate, for instance 1,3-butylene glycol diacrylate, 1,6-hexanediol diacrylate but preferably 1,4-butanediol diacrylate.

The other mono functional monomer may be any monomer that has a single polymerisable group. Preferably it will be any ethylenically unsaturated monomer. Typically these other monomers include esters selected from the group consisting of an ethylenically unsaturated carboxylic acid and salts thereof, amino alkyl esters of ethylenically unsaturated carboxylic acid or salts thereof, N-(amino alkyl) derivatives of acrylamide or methacrylamide or salts thereof, other water soluble acrylic monomers including acrylamide, esters of ethylenically unsaturated carboxylic acid, water soluble styrene derivatives, methacrylic acid or salts, acrylic acid or salts, vinyl sulphonic acid or salts, allyl sulphonic acid or salts, itaconic acid or salts, 2-acrylamido-2-methyl propane sulphonic acid or salts, acrylamide and vinyl acetate.

The aqueous phase provided may suitably contain an emulsification system which desirably could be either a stabiliser or a surfactant, typically and emulsifier. This may be formed by dissolving a suitable emulsification system, for instance containing an effective amount of stabiliser or surfactant into water. Suitably an effective amount of stabiliser or surfactant (preferably emulsifier) may be up to 50% by weight or higher based on the weight of the monomer blend that forms the polymeric shell. Preferably the amount of stabiliser or surfactant will be within the range of 1% and 40%, more preferably around 10% to 30%, based on the weight of the monomer blend that forms the polymeric shell.

Suitably the stabilisers or emulsifiers are soluble or dispersible in water at 25° C., thus enabling the stabiliser or emulsifier to be dispersed or preferably dissolved in the aqueous phase. Generally stabilisers or emulsifiers preferably have a high HLB (Hydrophilic Lipophilic Balance) such that it can be dissolved into water prior to emulsification of the monomer solution. It will be preferably the HLB will be at least 4 and for instance up to 12 or higher and more preferably at least 6, more preferably still between 8 and 12. Preferably the monomer solution is be emulsified into water with a polymerisation stabiliser dissolved therein.

In this process it is preferred that a stabiliser is added into the aqueous phase in order to help emulsification and also formation of the microcapsules. The stabiliser may be a suitable material that is water soluble or at least water dispersible. Preferably it will be an amphipathic polymeric stabiliser. More preferably the stabiliser will be a hydroxy containing polymer, for instance it may be polyvinyl alcohol, hydroxy ethyl cellulose, methyl cellulose, hydroxy propyl cellulose, carboxy methyl cellulose and methyl hydroxy ethyl cellulose. Generally it is preferred to use polyvinyl alcohol which has been derived from polyvinyl acetate, wherein between 85 and 95%, preferably around 90%, of the vinyl acetate groups have been hydrolysed to vinyl alcohol units. Other stabilising polymers may additionally be used.

The process may employ an additional material is to promote stability as part of an emulsifying system, for instance emulsifiers, other surfactants and/or other polymerisation stabilisers.

Other stabilising substances that may be used in the process preferably in addition to the stabilising polymer include ionic monomers. Typical cationic monomers include dialkyl amino alkyl acrylate or methacrylate including quaternary ammonium or acid addition salts and dialkyl amino alkyl acrylamide or methacrylamide including quaternary ammonium or acid addition salts. Typical anionic monomers include ethylenically unsaturated carboxylic or sulphonic monomers such as acrylic acid, methacrylic acid, itaconic acid, allyl sulphonic acid, vinyl sulphonic acid especially alkali metal or ammonium salts. Particularly preferred anionic monomers are ethylenically unsaturated sulphonic acids and salts thereof, especially 2-acrylamido-2-methyl propane sulphonic acid, and salts thereof. The other stabilising substance may be used in any effective amount, usually at least 0.01% and preferably up to 10% by weight of the monomer blend that forms the polymeric shell, and more preferably between 0.5% and 5%.

The polymerisation step may be effected by subjecting the aqueous monomer solution to any conventional polymerisation conditions. Generally polymerisation is effected by the use of suitable initiator compounds. Desirably this may be achieved by the use of redox initiators and/or thermal initiators. Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 1000 ppm, typically in the range 1 to 100 ppm, normally in the range 4 to 50 ppm.

Preferably the polymerisation step is effected by employing a thermal initiator alone or in combination with other initiator systems, for instance redox initiators.

Thermal initiators would include any suitable initiator compound that releases radicals at an elevated temperature, for instance azo compounds, such as azobisisobutyronitrile (AZDN), 4,4'-azobis-(4-cyanovalereic acid) (ACVA) or t-butyl perpivilate or peroxides such as lauroyl peroxide. Typically thermal initiators are used in an amount of up 50,000 ppm, based on weight of monomer. In most cases, however, thermal initiators are used in the range 5,000 to 15,000 ppm, preferably around 10,000 ppm. Preferably a suitable thermal initiator with the monomer prior to emulsification and polymerisation is effected by heating the emulsion to a suitable temperature, for instance 50 or 60° C. or higher.

Also included in the present invention is a process for manufacturing microcapsules comprising a core containing a hydrophobic liquid or wax within a polymeric shell, in which solid particles insoluble in the hydrophobic liquid or wax are distributed throughout the core, wherein an oil soluble dispersant polymer is adhered to the surface of the insoluble solid particles, comprising the steps, 1) forming a hydrophobic phase comprising the insoluble solid particles, oil soluble dispersant polymer and hydrophobic liquid or molten hydrophobic wax,
2) forming an aqueous monomer solution comprising a water-soluble amine formaldehyde resin, a water-soluble carboxylic acid which is preferably formic acid, a water-soluble anionic polymer and optionally a polymeric stabiliser or emulsifying agent,
3) forming an aqueous phase by partially reacting the components of the aqueous monomer solution optionally raising the temperature of the aqueous solution,
4) homogenising the monomer solution into the aqueous phase containing to form an emulsion,
5) subjecting the emulsion to polymerisation conditions, and
6) polymerising the monomer to form a dispersion of microcapsules in the aqueous phase.

Preferably the reactants in the emulsion are partially reacted by an ageing period optionally at an elevated temperature. Preferably the emulsion is initially maintained at a temperature of between 20 and 40° C. More preferably this will be for a period between 90 and 150 minutes.

Desirably the emulsion is subjected to temperatures of above 40° C. and preferably at least 50° C. in order to effect polymerisation and more preferably temperatures between 60 and 80° C. Higher temperatures may be employed although generally it is unlikely to be above 90° C. and usually significantly below. This polymerisation step results in the formation of microcapsules. Generally this step will require at least 30 minutes and preferably at least 1 hour. Considerably longer periods of time may be employed, for instance up to 150 minutes although longer periods may be required in some cases. In general we find that this step is normally completed within two hours.

The water-soluble anionic polymer is preferably a polymer of ethylenically unsaturated monomers in which at least one is anionic or potentially anionic. More preferably the polymer is acrylic, especially copolymers of acrylamide sodium acrylate or hydrolysed polyacrylamides. Generally these polymers will have a molecular weight of at least 10,000 g/mol and preferably at least 50,000 g/mol. Often the molecular weight can be as high as 1,000,000 g/mol but preferably below 500,000 g/mol.

This polymer can be prepared by conventional techniques known in the art.

Preferably a stabilising polymer or emulsifying agent is included in the aqueous phase and preferably this is polyethylene glycol. Desirably the polyethylene glycol will have a molecular weight between 200 g/mol and 800 g/mol, preferably between 300 g/mol and 600 g/mol.

Other general matters for preparing microcapsules of amino plastic resins are described in GB-A-2073132, AU-A-27028/88 and GB-A-1507739 particularly in the respective examples. These may be used in the present invention provided that they are adapted in accordance with the above detailed description.

The microcapsules of the present invention desirably may have an average particle size diameter is less than 10 microns. Generally the average particle size diameter tends to be much smaller, often less than 2 microns and typically the average particle diameter will be between 200 nm and 2 microns. Preferably the average particle size diameter is in the range 500 nm and 1.5 microns usually around 1 micron. Average particle size is determined by a Sympatec particle size analyser according to standard procedures well documented in the literature.

In general the shell should form at least 5% by weight based on the total weight of microcapsule. Preferably the microcapsule comprises hydrophobic oil or wax forms in an amount between 45 and 95% by weight and the shell in an amount of between 5 and 55% by weight in which all percentages of based on the total weight of the microcapsule.

More preferably the amount of hydrophobic liquid or wax is present in the amount between 60 and 92% by weight of microcapsule and particularly preferably between 70 and 92%, especially between 80 and 90%.

Preferably the core in the microcapsule comprises between 65 and 99% by weight hydrophobic liquid or wax, 0.95 to 25% by weight solid insoluble particles, and between 0.05 and 10% by weight of the oil soluble dispersant polymer based on the total weight of the microcapsule. More preferably the amount of oil soluble dispersant polymer will be between 0.1 and 7.5% by weight of the core and especially between 0.5 and 5% by weight. More preferably the solid insoluble particles are present in an amount between 1 and 20% by weight of the core and preferably between 2 and 15%. The hydrophobic liquid or wax will then make up the difference in the weight of the core.

When the microcapsules are used in active temperature control systems which use a heat transfer fluid in general the carrier fluid would have a higher density than the microcapsules in the absence of the particles. Therefore in order for the microcapsules to remain distributed throughout the carrier fluid without floating to the surface it would be necessary for them to have an equivalent density to the carrier fluid. Consequently, the insoluble particles will usually have a greater density than the hydrophobic liquid or wax.

The solid particles maybe any suitable particulate material that are insoluble in the hydrophobic liquid or wax. By insoluble in the hydrophobic liquid or wax we mean that the solid particles have a solubility of less than 5 g/100 cm$^3$ of hydrophobic liquid or wax at 25° C., preferably less than 2 g or 1 g/100 cm$^3$ and more preferably zero at least of undetectable solubility. Preferably the particles comprise metals, metal oxides or other inert metal compounds. More preferably the solid particles are substantially not soluble in water and are essentially not reactive with water. Desirably the solid particles will be selected from transition metals, metals from any of groups Ib, IIb, IIIb, IVb, oxides of these metals and other inert compounds of these metals. Preferred components of the insoluble particles include titanium, iron, lead, copper, nickel, barium and oxides thereof especially titanium, iron, titanium dioxide and/or iron (III) oxide.

Preferably the solid insoluble particles will have a density of greater than >1 g/cm$^3$, more preferably greater than >2 g/cm$^3$. The density may be as high as 6 g/cm$^3$ or higher but will often be within the range of 2 and 5 g/cm$^3$.

The solid particles should have a size sufficiently small that they fit easily within the microcapsule core. Usually the solid insoluble particles will be within 1 nm and 1000 nm. Generally the particles will have a weight average particle size diameter of below 750 nm and preferably between 50 and 700 nm, for instance between 90 and 600 nm. Preferably the solid insoluble particles are uniformly distributed throughout the core of the microcapsule.

The amount of solid insoluble particles used is typically as stated above.

We believe that the presence of the oil soluble dispersant polymer adhered to the surface of the solid particles that are held within the microcapsule is essential. The presence of this dispersant polymer provides a more even distribution of solid particles throughout the core of the microcapsule than could be otherwise achieved. Without being limited to theory it is believed that this allows microcapsules to be produced with a narrow density distribution and generally equivalent densities. Preferably at least 90% by weight of a distribution of microcapsules of the present invention will have densities that are within 5% of the weight average density. More preferably this will be within 2%.

The oil soluble dispersant polymer is desirably a polymer that is soluble or dispersible in the hydrophobic liquid or wax. Preferably it will be an amphipathic polymer. More preferably the dispersant polymer is an amphipathic polymer formed from ethylenically unsaturated monomers and preferably a blend of one or more lipophilic and optionally additionally other hydrophobic monomers and one or more hydrophilic monomers. Lipophilic monomers of particular value include C8 to C30 alkyl esters of acrylic acid, methacrylic acid, maleic acid and itaconic acid. Other hydrophobic monomers that may be used in addition to the lipophilic monomers and hydrophilic monomers include other esters of ethylenically unsaturated carboxylic acids including C1 to C7 alkyl esters of acrylic acid, methacrylic acid, maleic acid and itaconic acid. Other hydrophobic monomers include styrene, vinyl acetate and vinyl chloride. Hydrophilic monomers of particular value include ethylenically unsaturated carboxylic acids or salts thereof, acrylamide, amino alkyl esters of ethylenically unsaturated carboxylic acids (including acid addition salts and quaternary ammonium salts) and ethylenically unsaturated sulphonic acids or salts thereof. A particularly preferred oil soluble dispersant polymer is formed from a monomer comprising ethylenically unsaturated carboxylic acid and an alkyl ester of an ethylenically unsaturated carboxylic acid. Of particular benefit are polymers formed from a monomer blend comprising methacrylic acid and/or acrylic acid with C 16 to 20 alkyl esters of methacrylic acid and/or acrylic acid, especially copolymers of stearyl methacrylate with methacrylic acid.

The oil soluble dispersant polymer will normally be formed from a monomer blend containing more lipophilic monomer than hydrophilic monomer. Typically the lipophilic monomer will make up at least 60% by weight of the total weight of monomer blend and this may be as much as 99% by weight. Usually the hydrophilic monomer will be present in an amount of at least 1% by weight and often up to 40% by weight. Preferably the ratio of lipophilic monomer to hydrophilic monomer will be between 65:35 and 99:1 weight ratio and more preferably between 70:30 and 90:10 weight ratio in particular between 75:25 and 85:15 weight ratio based on the total weight of monomer blend.

Preferably the dispersant polymer has a weight average molecular weight of below 50,000 g/mol. Usually the dispersant polymer will have a molecular weight of at least 2000 g/mol and generally above 3000 g/mol. More preferably the polymer will have a weight average molecular weight within the range of 10,000 g/mol and 30,000 g/mol.

The hydrophobic wax may be a solid or a liquid at ambient temperatures (e.g. 15 to 30° C. at atmospheric pressure). Preferably the hydrophobic liquid includes any hydrophobic substances that are liquid at ambient temperatures (e.g. 15 to 30° C. at atmospheric pressure).

Generally the hydrophobic liquid or wax comprised in the core may be an organic material. For instance the hydrophobic liquid may be an oil or a molten wax. Preferably the hydrophobic substance is a non-polymeric material. More preferably the hydrophobic liquid or wax is a hydrocarbon. The oil or wax may contain active materials, such as UV absorbers, UV reflectors, or flame retardants dispersed or dissolved therein. Thus the core material may a homogenous or alternatively may comprise a dispersion of additional solid active material dispersed throughout a continuous core medium of hydrophobic substance.

When the core material comprises a phase change material, generally the phase change material is an oil or a wax which is liquid at a temperature between −30° C. and 150° C.

Typical examples of flame retardants suitable for the present invention include bromobenzoates as described in U.S. Pat. No. 5,728,760 and halogenated phosphates, thiophosphates orthiophosphoryl chlorides as given in U.S. Pat. No. 3,912,792.

Suitable ultra violet light absorbers of the present invention include naphthalene-methylenemalonic diesters, for instance as mentioned in U.S. Pat. No. 5,508,025 or compositions comprising mixtures of benzotriazoles and 2-hydroxy benzophenones as claimed by U.S. Pat. No. 5,498,345.

When the core material is a phase change substance it may be for instance any known hydrocarbon that melts at a temperature of between −30 and 150° C. Generally the substance is a wax or an oil and preferably has a melting point at between 20 and 80° C., often around 40° C. Desirably the phase change substance may be a $C_{8-40}$ alkane or may be a cycloalkane. Suitable phase change materials include all isomers of the alkanes or cycloalkanes. In addition it may also be desirably to use mixtures of these alkanes or cycloalkanes. The phase change material may be for instance any of the compounds selected from n-octadecane, n-tetradecane, n-pentadecance, n-heptadecane, n-octadecane, n-nonadecane, n-docosane, n-tricosane, n-pentacosane, n-hexacosane, cyclohexane, cyclooctane, cyclodecane and also isomers and/or mixtures thereof.

In a preferred form of the invention the core consists essentially of a hydrophobic substance, for instance at least 90%, which is a non-polymeric material, for instance an oil or wax, in particular a phase change material. Although the preferred hydrophobic substance is a phase change material which is essentially non-polymeric, it is within the scope of the present invention for smaller amounts of polymeric additives to be included within the phase change non-polymeric material.

Usually this will be in amounts of less than 10% by total weight of core and often will be less than 5, for instance 0.5 to 1.5 or 2% by weight. A particularly desirable polymeric additive is a substance that will modify the properties of the phase change material. For instance it is known that the temperature at which a phase change material melts on absorbing heat can be significantly different from the temperature at which it solidifies when losing heat. Thus a particularly desirable polymeric additive would be a substance which will bring the melting and solidifying temperatures closer together. This minimisation of the shift in melting/freezing point of the phase change material may be important in various domestic applications or for garments.

Alternatively the phase change material comprised in the core could be a substance other than a hydrocarbon.

The phase change material could be an inorganic substance that absorbs and desorbs latent heat during a liquefying and solidifying phase transition. The inorganic substance may be a compound which releases or absorbs heat during a dissolving/crystallisation transition. Such inorganic compounds include for instance sodium sulphate decahydrate or calcium chloride hexahydrate. Thus the inorganic phase change material may be any inorganic substance that can absorb or desorb thermal energy during a transition at a particular temperature. The inorganic phase change material may be in the form of finely dispersed crystals which are dispersed throughout the core matrix which comprises a hydrophobic substance. In one form the inorganic phase change material is dispersed throughout a solid hydrophobic substance such as a wax.

Alternatively the hydrophobic substance comprised in the core remains substantially liquid and contains crystals of the inorganic phase change material dispersed throughout the liquid. Preferably the hydrophobic liquid is a hydrocarbon. During a phase change the crystals become liquid droplets dispersed throughout the liquid. It may be advantageous to include a suitable surfactant, such as a water in oil emulsifier into the hydrophobic liquid in order to prevent coalescence of the dispersed droplets of liquid. Preferably the inorganic phase change material is dispersed throughout a matrix of hydrocarbon phase change material which is a wax or an oil. In this preferred embodiment the hydrocarbon and inorganic materials may both absorb or desorb heat. Alternatively the hydrocarbon phase may be a carrier oil that is not necessarily a phase change material. In this instance the carrier oil may be a process aid.

When the hydrophobic liquid or wax is a phase change material used for thermal storage in may be used in conjunction with a suitable nucleating agent to prevent supercooling, for instance as described in U.S. Pat. No. 5,456,852 or for instance in International patent application PCT/EP 2006/066934 (Internal Attorney Docket No 22375) unpublished at the date of filing of the present application.

The microcapsules of the present invention may be used in a variety of applications including textiles (for instance within the body of the fibre or alternatively coating the fibre or textile), automotive applications (including use in circulatory cooling fluids or a coolant within the interior design), construction industry (for instance in passive or active ventilation systems), or heat transfer fluids (as a capsule within a modified heat transfer fluid). It is possible to incorporate the microcapsules of the present invention into any suitable article, for instance fibres, textile products, ceramics, coatings etc. Thus a further aspect of the present invention we provide an article comprising microcapsules. Hence according to the invention it is possible to provide an article which comprises encapsulated flame retardants, UV absorbers, active dye tracer materials or phase change material. In the case of encapsulated flame retardants it would be desirable for the flame retardant to be retained during any processing steps such as fibre formation.

A particular benefit of the microcapsules of the present invention is that they can be prepared such that they have a desired density.

Thus we provide a process in which the microcapsules have a chosen density, comprising the additional steps,
1) identifying the chosen density,
2) determining the density of microcapsules comprising a core containing a hydrophobic liquid or wax within a polymeric shell,
3) determining the required amount of the insoluble solid particles in order to provide the microcapsules with the chosen density, and
4) combining the required amount of the insoluble solid particles in the respective process.

The microcapsules may be dispersed in a liquid, for instance a carrier liquid as part of a heat transfer fluid. Thus we provide a dispersion of microcapsules in a liquid in which the microcapsules comprise a core containing a hydrophobic liquid or wax within a polymeric shell, in which solid particles insoluble in the hydrophobic liquid or wax are distributed throughout the core, wherein an oil soluble dispersant polymer is adhered to the particle surface.

An advantage of the microcapsules of the present invention is that they can be manufactured such that their density matches the density of the liquid in which they are to be dispersed. Consequently, it is preferred that the dispersion of microcapsules in the liquid have substantially the same density.

We further provide a process of preparing a dispersion of microcapsules in a liquid in which the microcapsules comprise a core containing a hydrophobic liquid or wax within a polymeric shell, in which solid particles insoluble in the hydrophobic liquid or wax are distributed throughout the core, comprising the steps providing the liquid and providing the microcapsules and then combining the microcapsules with the liquid to form a dispersion.

Preparation of such a dispersion of microcapsules may desirably be prepared so that the density of the microcapsules is substantially the same the density of the liquid into which they are to be dispersed.

This may be achieved conveniently by the steps:
1) identifying the density of said liquid,
2) determining the density of microcapsules comprising a core containing a hydrophobic liquid or wax within a polymeric shell,
3) determining the required amount of the insoluble solid particles in order to provide the microcapsules with the chosen density,
4) preparing said microcapsules as defined above, and
5) combining said microcapsules with said liquid in order to form the dispersion.

The following examples illustrate the invention.

EXAMPLES

Analysis Methods

Electron Microscopy

The microspheres were mounted onto aluminium stubs using double sided adhesive tape. After gold coasting using a Bio-Rad SC500 the microspheres were observed by scanning electron microscopy (Carl Zeiss SMT Electron Microscope 260).

Particle Size Analysis

Particle size analysis was conducted using a Sympatec HELOS Analyzer (ex Sympatec (GmBH)) fitted with a QUIXCELL unit employing either R1 or R4 lens configuration.

Thermal Analysis

Thermal Analysis was conducted using a Perkin-Elmer Thermo gravimetric Analyzer using a temperature range of 110° C. to 500° C. at a heating rate of 20° C./min
Two main measurements are taken
Mass loss @300° C.: this is the amount of material lost (expressed as a percentage) from the sample between the starting condition, 110° C., and 300° C.
Half height: this is the half-height of the decay curve.

Sedimentation Analysis

Sedimentation Analysis was conducted using a Turbiscan Lab Expert (ex Formulation France). Samples were prepared by dilution of the microcapsule slurries to 30 wt % active content in water. Measurements were taken over 4 days with data being collected for backscatter and transmittance.

Example 1

Acrylic Based Microencapsulation of Octadecane Containing Titanium Dioxide

A first oil phase is prepared by mixing Octadecane (152 g), a 30% hydrocarbon solution of an oil soluble dispersant (5 g of a 80/20 stearyl methacrylate/methacrylic acid copolymer molecular weight 20,000 available from Ciba Specialty Chemicals) and Titanium dioxide (5 g ex Ciba Specialty Chemicals). This mixture was subjected to ultra sonic mixing for 10 minutes at a temperature greater than the melting point of the wax. To this hydrocarbon dispersion of Titanium dioxide, methyl methacrylate (3.28 g), butane diol diacrylate (8.68 g) and methacrylic acid (9.70 g) are added followed by Alperox LP (0.22 g ex Elf Atochem, France). This phase is mixed until the Alperox fully dissolves.

An aqueous phase is prepared by mixing poly(vinyl alcohol) (5.4 g Gohsenol GH20R ex Nippon Gohseii), water (122 g) and Sodium 2-acrylamido-2-methyl propane sulphonic acid (0.64 g of 50% active ex Lubrizol, France).

The aqueous phase and oil phase were separately warmed to 40° C. and emulsified together using a Silverson L4R laboratory homogenizer. After ten minutes a stable emulsion is obtained.

The resultant emulsion is poured into a reaction vessel equipped for polymerisation situated in a water bath @75° C. After three hours at this temperature, ammonium persulphate solution (0.22 g in 10 ml water) is added and the temperature increased to 80° C. After a further two hours at this higher temperature, the mixture is cooled to room temperature to yield a dispersion of wax covered polymer shelled micro capsules of average particle size of ~2 μm.

Thermal analysis of the material using methods outlined above showed a mass loss of 19% at 300° C. and a half height of 379° C.

Comparative Example 1

Acrylic Based Microencapsulation of Octadecane

A first oil phase is prepared by mixing Octadecane (152 g), methyl methacrylate (3.28 g), butane diol diacrylate (8.68 g) and methacrylic acid (9.70 g) followed by Alperox LP (0.22 g ex Elf Atochem, France). This phase is mixed until the Alperox fully dissolves.

An aqueous phase is prepared by mixing poly(vinyl alcohol) (5.4 g Gohsenol GH20R ex Nippon Gohseii), water (122 g) and Sodium 2-acrylamido-2-methyl propane sulphonic acid (0.64 g @50% active ex Lubrizol, France).

The aqueous phase and oil phase were separately warmed to 40° C. and emulsified together using a Silverson L4R laboratory homogenizer. After ten minutes a stable emulsion is obtained.

The resultant emulsion is poured into a reaction vessel equipped for polymerisation situated in a water bath @75° C. After three hours at this temperature, ammonium persulphate solution (0.22 g in 10 ml water) is added and the temperature increased to 80° C. After a further two hours at this higher temperature, the mixture is cooled to room temperature to yield a dispersion of wax covered polymer shelled micro capsules of average particle size of ~2 μm.

Thermal analysis of the material using methods outlined above showed a mass loss of 5% at 300° C. and a half height of 380° C.

Example 2

Aminoplast Based Microencapsulation of an Oil Containing Titanium Dioxide

An oil phase is prepared by mixing eicosane wax (135 g), an oil soluble polymeric dispersant (0.75 g of a 80/20 stearyl methacrylate/methacrylic acid copolymer molecular weight 20,000 available from Ciba Specialty Chemicals) and titanium dioxide (15 g ex Ciba Specialty Chemicals) at 60° C. The mixture is stirred to homogeneity and ultrasonicated for ~30 mins in a water bath at a temperature greater than the melting point of the wax.

The aqueous phase is prepared by mixing poly(acrylic acid-co-acrylamide) (20.8 g Alcapsol P604, Ciba Specialty Chemicals, solid content ~18%) and de-ionised water (267.7 g). The solution is warmed to 45° C.; melamine-formaldehyde resin (36.4 g Beetle Resin PT336 ex BIP, solid content ~70%) and formic acid (0.84 g at 95-97%) are added.

The resulting solution is stirred at 45° C. for about 7 minutes, resulting in a slightly milk-white aqueous phase.

The oil and aqueous phases are emulsified together using a Silverson L4RT homogeniser at ~4500 rpm for about 5 minutes to give a stable emulsion which is poured into an appropriately equipped reaction flask situated in a water bath. The reaction mass is stirred at 35° C. for 2 hours followed by 60° C. for 3 hours; optionally, urea (3.75 g) is added to the reaction mass after one hour at 60° C.

Finally the reaction mass is cooled to room temperature and neutralised using NaOH solution (1.05 g of a ~46% wt/wt aqueous solution), resulting in a fluid dispersion of average particle size ($D_{50}$) 35 μm. The thermal stability of the encapsulated product was using the analysis methods outlined previously. A mass loss of 16.3% at 300° C. was found, with a half height temperature of 415° C.

Examples 3 to 7

The methodology of example 2 was repeated with the compositional variation outlined below.

TABLE 1

| Composition | Example 3 | Example 4 | Example 5 | Example 6 | Example 7 |
|---|---|---|---|---|---|
| *Aqueous Phase/g* | | | | | |
| Alcapsol P604 | 15 | 13.9 | 42.8 | 42.8 | 42.8 |
| Beetle PT336 | 26.2 | 24.6 | 16.9 | 16.9 | 16.9 |
| Formic Acid | 0.8 | 0.8 | 2.0 | 2.0 | 2.0 |
| Water | 200 | 190 | 126 | 126 | 126 |
| Polyethylene glycol 300 | 0.18 | 0.15 | | | |
| Burst 5470 | | | 0.50 | 0.50 | 0.70 |
| *Oil Phase/g* | | | | | |
| Eicosane | 95 | 87.70 | 88 | | |
| Octadecane | | | | 87.5 | 87.5 |
| Dispersant | 0.8 | 0.82 | 2.0 | 2.0 | 3.0 |
| Titanium dioxide | 12.3 | 12.3 | 12.3 | | |
| iron(III) oxide | | | | 12.6 | |
| iron(III)oxide nanopowder | | | | | 5 |
| *Emulsification* | | | | | |
| Time/minutes | 5 | 5 | 3 | 5 | 5 |
| Speed/rpm | 4500 | 4500 | 4000 | 4500 | 8500 |
| *Cure Conditions* | | | | | |
| Cure regime | 35° C. for 2 hours 60° C. for 3 hours | 35° C. for 2 hours 60° C. for 3 hours | 35° C. for 2 hours 60° C. for 3 hours | 35° C. for 2 hours 60° C. for 3 hours | 35° C. for 2 hours 60° C. for 3 hours |

TABLE 1-continued

| | | | | | |
|---|---|---|---|---|---|
| Optional Addition/g | | | | | |
| Urea | 2.55 | 2.50 | 2.50 | | |
| Neutralisation/g | | | | | |
| NaOH | 1 | 1.0 | 2.5 | 2.5 | 2.5 |
| Results (Analysis conducted as per Example 1) | | | | | |
| Particle Size/μm | | | | | |
| Average, $D_{50}$ | 25 | 19.9 | 13 | 10 | 4.5 |
| Thermal Analysis | | | | | |
| Mass Loss at 300° C./% | 6.0 | 7.6 | 10.1 | 6.1 | 4.2 |
| Half height/° C. | 396 | 406 | 351 | 356 | 381 |

| Sedimentation Data | | |
|---|---|---|
| Sample ex | % change backscatter | Comment |
| Example 1 | −0.5 | No settlement |
| Comparative Example 1 | −13 | Settlement within 4 days |
| Example 3 | −4 | Slight settlement |

The invention claimed is:

1. A microcapsule comprising:
a core containing a hydrophobic liquid or wax within a polymeric shell,
wherein solid particles insoluble in the hydrophobic liquid or wax are distributed throughout the core, wherein an oil soluble dispersant polymer is adhered to the surface of the solid insoluble particles,
wherein the core comprises:
65 to 99% by weight hydrophobic liquid or wax,
0.95 to 25% by weight solid insoluble particles,
0.05 to 10% by weight oil soluble dispersant polymer based on the weight of the core and in which the components total 100%, and
wherein the polymeric shell is formed from:
1 to 95% by weight hydrophobic mono functional ethylenically unsaturated monomer,
5 to 99% by weight polyfunctional ethylenically unsaturated monomer,
0 to 60% by weight other mono functional monomer,
based on the weight of the polymeric shell in which all of the components total 100%.

2. A microcapsule according to claim 1 comprising 45 to 95% by weight core,
5 to 55% by weight shell,
based on the total weight of microcapsule.

3. A microcapsule according to claim 1 in which the insoluble particles have a greater density than the hydrophobic liquid or wax.

4. A microcapsule according to claim 1 in which the solid insoluble particles comprise metals or metal oxides.

5. A microcapsule according to claim 1 in which the solid insoluble particles comprise titanium dioxide or iron (III) oxide.

6. A microcapsule according to claim 1 in which the oil soluble dispersant polymer is an amphipathic polymer.

7. A microcapsule according to claim 1 in which the oil soluble dispersant polymer is formed from a monomer blend comprising ethylenically unsaturated carboxylic acid and an alkyl ester of an ethylenically unsaturated carboxylic acid.

8. A microcapsule according to claim 1 in which the hydrophobic liquid or wax is a hydrocarbon.

9. A microcapsule according to claim 1 in which the hydrophobic liquid or wax has a melting point at a temperature between −30° C. and 150° C.

10. A microcapsule according to claim 1 in which the polymeric shell is formed from either an acrylic resin or an aminoplast resin.

11. A microcapsule according to claim 1 in which the polymeric shell is an aminoplast resin is an amine formaldehyde resin.

12. A dispersion of microcapsules in a liquid in which the microcapsules comprise a core containing a hydrophobic liquid or wax within a polymeric shell,
wherein solid particles insoluble in the hydrophobic liquid or wax are distributed throughout the core, wherein an oil soluble dispersant polymer is adhered to the surface of the insoluble solid particles,
wherein the core comprises:
65 to 99% by weight hydrophobic liquid or wax,
0.95 to 25% by weight solid insoluble particles,
0.05 to 10% by weight oil soluble dispersant polymer based on the weight of the core and in which the components total 100%, and
wherein the polymeric shell is formed from:
1 to 95% by weight hydrophobic mono functional ethylenically unsaturated monomer,
5 to 99% by weight polyfunctional ethylenically unsaturated monomer,
0 to 60% by weight other mono functional monomer,
based on the weight of the polymeric shell in which all of the components total 100%.

13. A dispersion according to claim 12 in which the microcapsules have substantially the same density as the liquid.

* * * * *